UNITED STATES PATENT OFFICE

KARL MARX, OF DESSAU IN ANHALT, AND ERICH LEHMANN, OF WOLFEN KREIS, BITTERFELD, GERMANY, ASSIGNORS TO GENERAL ANILINE WORKS, INC., OF NEW YORK, N. Y., A CORPORATION OF DELAWARE

PROCESS FOR DYEING FURS, HAIRS, AND FEATHERS

No Drawing. Application filed October 24, 1929, Serial No. 402,314, and in Germany November 7, 1928.

Our present invention relates to a new process of dyeing furs, hairs, feathers, and to the products obtainable by this process.

We have found that 4-amino-N-alkyl- or -aralkyl-diphenylamines of the general formula

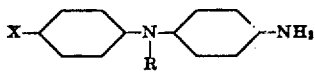

wherein R represents an alkyl or aralkyl-group or a substituted alkyl- or aralkyl-group, and X stands for hydrogen, halogen or alkyl, very useful in dyeing furs, hairs, feathers, or the like.

In contradistinction to 4-amino-diphenylamine the salts of the N-substituted 4-amino-diphenylamine are easily soluble in water and they yield valuable gray tints on furs, hairs, feathers and the like, even when dyed from a solution in hard water or from a solution which is alkaline, for instance by the presence of a small amount of ammonia.

The following example serves to illustrate our invention.

The fur to be dyed is previously washed with a diluted solution of ammonia or of sodium carbonate and then thoroughly rinsed. Then it is introduced into the dye bath having a temperature of 25 to 30° C., which contains per liter 2 parts of the hydrochloric acid salt of 4-amino-N-methyldiphenylamine of the formula

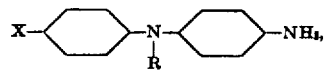

and about 10 to 20 parts of hydrogen peroxide (of about 3 per cent strength). A dyeing is performed, for example during 2 to 3 hours, whereupon the fur is well washed, whirled in a centrifugal machine and finished in the usual manner. Thus is obtained a clear gray of a very good fastness against light and weather. Furthermore, the tint obtained is fast to the action of alkalies.

It is obvious to those, skilled in the art, that our present invention is not limited to the foregoing example or to the details given therein. Thus, for instance, the 4-amino-N-methylaminodiphenylamine may be substituted by other compounds having the chemical structure of the general formula given above. Similar tints are obtained when using for instance 4-amino-N-ethyldiphenylamine, 4-amino-N-propyldiphenylamine, 4-amino-N-butyldiphenylamine, 4-amino-N-benzyldiphenylamine, 4-amino-N-ethoxydiphenylamine, or corresponding compounds with a substituent in the para-position of the benzene nucleus. Furthermore, the fur to be dyed may be treated with a mordant.

The N-substituted amines mentioned above, may be manufactured by subjecting the N-substituted diphenylamines to a nitration process and subsequently to a reduction process, whereat the reaction products preferably are converted in a corresponding salt of the amine.

What we claim is:—

1. The process for dyeing furs, hairs, feathers, which consists in applying to the material to be dyed a solution containing an N-substituted 4-amino-diphenylamine of the general formula

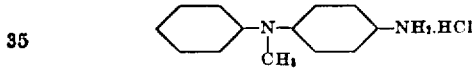

wherein R represents alkyl, aralkyl or substituted alkyl or aralkyl, and X represents hydrogen, halogen or alkyl, and an oxidizing agent.

2. The process for dyeing furs, hairs, feathers which consists in applying to the material to be dyed a solution containing a 4-amino-N-methyldiphenylamine of the formula

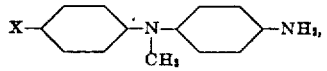

wherein X represents hydrogen, halogen or alkyl, and an oxidizing agent.

3. The process for dyeing furs, hairs, feathers which consists in applying to the material to be dyed a solution containing 4-amino-N-methyldiphenylamine and an oxidizing agent.

4. Furs, hairs, feathers, dyed with an oxidation product of an N-substituted 4-aminodiphenylamine of the general formula
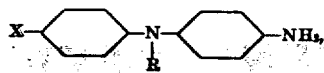
wherein R represents alkyl, aralkyl or substituted alkyl or aralkyl and X represents hydrogen, halogen or alkyl.
In testimony whereof, we affix our signatures.
KARL MARX.
ERICH LEHMANN.

tion product of an N-substituted 4-amino-diphenylamine of the general formula wherein R represents alkyl, aralkyl or substituted alkyl or aralkyl and X represents hydrogen, halogen or alkyl.

In testimony whereof, we affix our signatures.

KARL MARX.
ERICH LEHMANN.

Certificate of Correction

Patent No. 1,795,133.   Granted March 3, 1931, to

KARL MARX ET AL.

It is hereby certified that error appears in the printed specification of the above-numbered patent requiring correction as follows: Page 1, after line 76, in the formula, for the group of characters "$NH_3$," read $NH_2$; and that the said Letters Patent should be read with this correction therein that the same may conform to the record of the case in the Patent Office.

Signed and sealed this 12th day of May, A. D. 1931.

[SEAL.]

M. J. MOORE,
*Acting Commissioner of Patents.*

Certificate of Correction

Patent No. 1,795,133.  Granted March 3, 1931, to

KARL MARX ET AL.

It is hereby certified that error appears in the printed specification of the above-numbered patent requiring correction as follows: Page 1, after line 76, in the formula, for the group of characters "$NH_3$" read $NH_2$; and that the said Letters Patent should be read with this correction therein that the same may conform to the record of the case in the Patent Office.

Signed and sealed this 12th day of May, A. D. 1931.

[SEAL.]

M. J. MOORE,
*Acting Commissioner of Patents.*